No. 687,724.  
Patented Dec. 3, 1901.

J. F. CADELL.  
BORING TOOL.  
(Application filed June 21, 1899.)

(No Model.)

Witnesses:  
Fenton S. Belt,  
William E. Neff

Inventor  
J. F. Cadell  
By J. A. Watson  
Attorney

THE NORRIS PETERS CO., PHOTO-LITHO., WASHINGTON, D. C.

UNITED STATES PATENT OFFICE.

JOHN F. CADELL, OF BALTIMORE, MARYLAND, ASSIGNOR TO OTT. MERGENTHALER COMPANY, OF BALTIMORE, MARYLAND, A CORPORATION OF DELAWARE.

BORING-TOOL.

SPECIFICATION forming part of Letters Patent No. 687,724, dated December 3, 1901.

Application filed June 21, 1899. Serial No. 721,353. (No model.)

*To all whom it may concern:*

Be it known that I, JOHN F. CADELL, a citizen of the United States, residing at the city of Baltimore, State of Maryland, have invented certain new and useful Improvements in Boring-Tools, of which the following is a specification.

My invention relates to tools for boring holes in metal plates, and particularly for boring boiler-plates to receive the tubes.

The object of the invention is to provide a boring-tool of this class which is simple in construction and very effective in operation and in which inexpensive cutters formed from ordinary bars of tool-steel may be used.

The invention will be described in detail in the following specification, reference being had to the accompanying drawings, in which—

Figure 1:
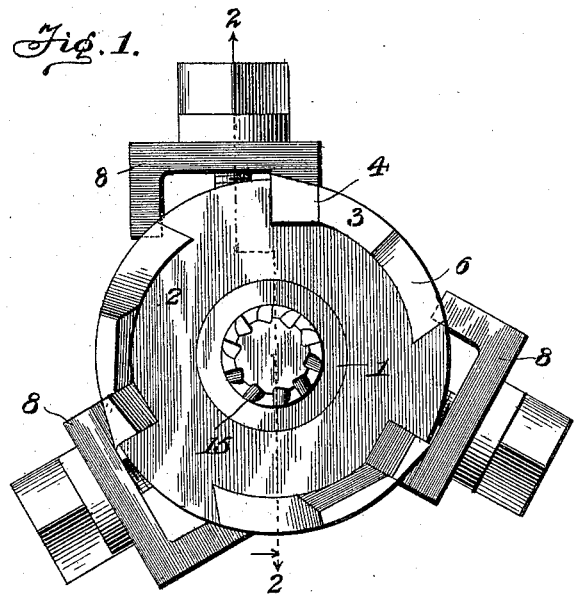
Figure 3:
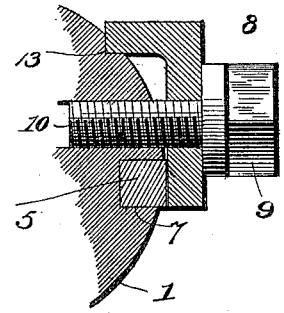
Figure 2:
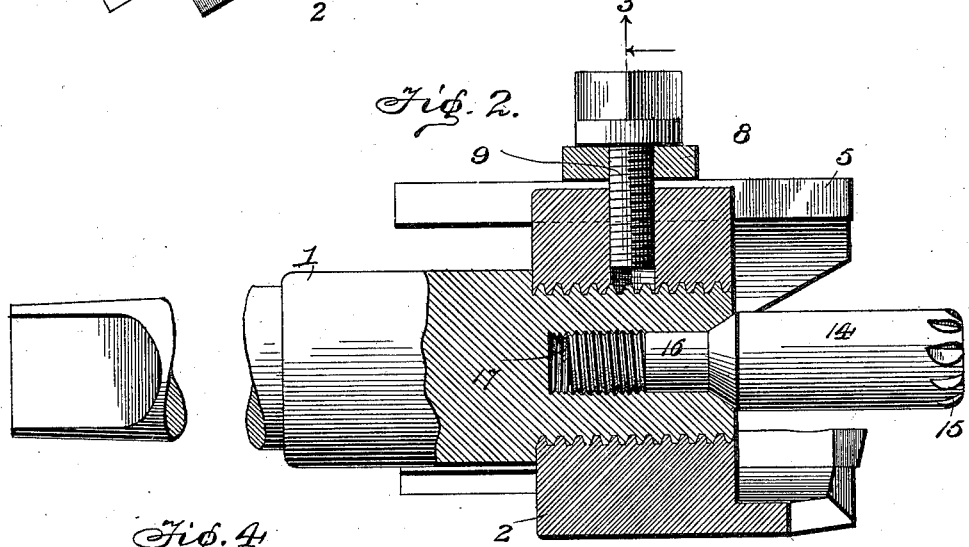
Figure 4:
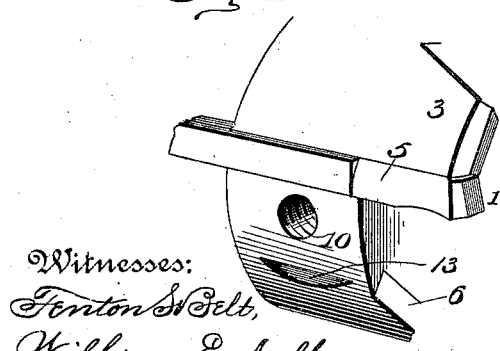
Figure 5:
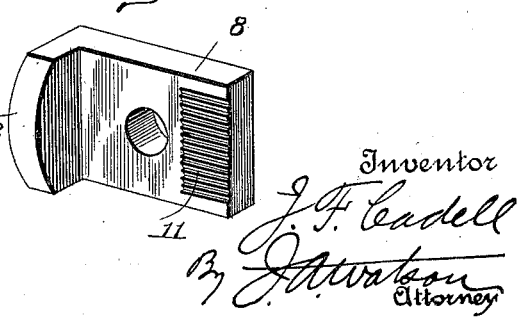

Figure 1 is a view of the cutting end of the boring-tool. Fig. 2 is a side view of the same, partly in section on the line 2 of Fig. 1 and partly broken away. Fig. 3 is a section on the line 3 of Fig. 2. Fig. 4 is a perspective view of a portion of the head, and Fig. 5 is a perspective view of one of the clamps.

In the drawings, 1 indicates the stock of the tool, and 2 a cylindrical head which is screwed onto the stock, as clearly illustrated in Fig. 2. The head is provided on its forward side with circular flange-sections 3, having straight forward edges 4, which support the cutters 5, the rear sides of the supporting flange-sections being cut away, as at 6, and a considerable space left between the rear of each support and the forward side of the succeeding cutter to provide ample room for the escape of the cuttings. In the periphery of the head there are a plurality of grooves 7, adapted to receive the cutters 5, the grooves and cutters being preferably rectangular, as shown. The cutters are formed of ordinary square rods of tool-steel slightly ground away at their forward ends into suitable shape and of full rectangular section for the remainder of their length. The forward or cutting edges of the tools are radial to the center of the stock, and the inner lines of the cutters may be at right angles to these radii. The cutter edges extend slightly beyond the periphery of the head, so as to give clearance for the supports 3. The cutters may be arranged as shown, the first cutting one-third of the total width, the second cutting about two-thirds, and the third cutting the full width, in which case the first cutter should cut deepest, the others following in succession.

The cutters are held in position by clamps of novel construction. Each cutter is provided with a clamp consisting of an L-shaped jaw 8 and a clamping-screw 9, which enters a hole 10 in the head. The forward end of the clamp is preferably roughened or provided with teeth 11 to firmly hold the cutter-bars. In order to permit the forward end to be seated accurately and across its entire surface on the cutter-bar, the bearing 12 of the other end is curved in the arc of a circle and is seated in a circular notch 13, formed in the periphery of the head. In this manner the cutters are held firmly and solidly in position.

The tool is provided on its forward end with a central spindle 14, which enters a hole previously drilled in the plate and guides the tool. This spindle is preferably provided with hardened teeth or cutters 15 on its forward end for the purpose of reaming the hole to the exact size of the spindle. The spindle is removable from the stock, so that its cutters 15 may be readily sharpened or repaired. As shown, it is provided with a threaded shank 16, which screws into an opening 17 in the forward end of the stock.

One of the principal advantages of my invention is that specially-formed cutters are not essential. The cutters used are simply ordinary bars of tool-steel having their forward ends ground into shape and tempered. When the cutters are dulled or worn, the grinding can be carried farther back on the bar and the bar advanced. As the cutters are the only parts liable to wear and are inexpensive, the tool is exceedingly durable and economical.

Other valuable features of the invention are the clamps, which adjust themselves accurately to the tools, and the removable centering-spindle having cutters on its forward end.

Having described my invention, what I claim, and desire to secure by Letters Patent, is—

1. A boring-tool comprising a stock, a head, flanges 3 projecting forwardly from the periphery of the head, grooves in the side of the head registering with the forward faces of the flanges, and means for clamping cutter-bars in said grooves, said flanges being cut away in the rear of the cutter-bars to form recesses for the escape of the cuttings, for the purpose set forth.

2. A boring-tool comprising a stock, a head removably connected to the stock, cutter-grooves in the side of said head, cutter-bars in said grooves, forwardly-projecting flanges registering with said grooves, recesses in the rear of said flanges for the escape of the cuttings, cutter-bar clamps, and a centering-spindle detachably inserted in the forward end of the stock.

3. A boring-tool comprising a stock, a head, grooves in said head, cutter-bars in said grooves, and clamps for holding said bars, each clamp comprising an L-shaped jaw having one straight face arranged to rest upon the cutter-bar and a rounded end or surface arranged to rest upon the head, whereby the jaw may seat itself securely upon the cutter-bar.

4. The combination with the stock, the head having a series of cutter-bar grooves and a series of clamp-bearing recesses, and the cutter-bars in said grooves, of clamps for holding said bars each consisting of an L-shaped jaw having a rounded end adapted to rest in one of the recesses in the head, and a flat face arranged to engage with the cutter-bar, as set forth.

In testimony whereof I affix my signature in presence of two witnesses.

JOHN F. CADELL.

Witnesses:
WILLIAM G. HOOFNAGLE,
ELDRIDGE E. HENDERSON.